United States Patent Office 2,776,304
Patented Jan. 1, 1957

2,776,304

STEROL DEHYDROHALOGENATION PROCESS

Howard C. Klein, Brooklyn, N. Y., and Roland Kapp, Newark, N. J., assignors to Nopco Chemical Company, Harrison, N. J., a corporation of New Jersey No Drawing. Application November 30, 1953,
Serial No. 395,270

18 Claims. (Cl. 260—397.2)

This invention relates to an improvement in the process for producing 7-dehydrosterols and more particularly to an improved process for the dehydrohalogenation of halogenated sterol compounds.

Since the discovery of Ziegler (Annalen 551, 80–119) that the halogenation of organic compounds at a carbon atom alpha to a double bond could be accomplished by using compounds such at N-halogenated acid amides and imides as halogenating agents, a great deal of research has been carried out on the application of this reaction to the production of 7-dehydro derivatives of various sterol compounds. The greater part of this work has been directed to the production of 7-dehydrocholesterol. As is well known, 7-dehydrocholesterol is readily converted to vitamin $D_3$ by irradiation with ultra-violet light. In order to form 7-dehydrocholesterol from the halogenated cholesterol compounds produced in accordance with the Ziegler process, it is necessary to subject the halogenated sterol compounds to dehydrohalogenation with a suitable dehydrohalogenating agent. The compounds which have been most frequently employed to react with the halogenated sterol derivatives to effect dehydrohalogenation are organic compounds such as dimethylaniline, diethylaniline, collidine, and quinoline. Compounds such as triethyl amine, N,N-dipropylaniline, N-ethyl-piperidine and N,N-diethylcyclohexyl amine have also been employed for this purpose. More recently U. S. Patents No. 2,546,787 and No. 2,546,788 have disclosed the use of quinaldine for this purpose. The use of this compound has made possible the realization of increased yields of 7-dehydrocholesterol of greater purity than could be obtained prior to the use of quinaldine as a dehydrohalogenating agent. However, like others of the previously known dehydrohalogenating agents, quinaldine is not as readily available as in desirable and it is expensive to use because of its high initial cost.

Comparatively few attemps have been made by the prior art to use inorganic materials, such as the metal salts or metal hydroxides, or organo-metallic compounds, such as sodium acetate, as dehydrohalogenating agents. Those attempts which have been made have been relatively unsuccessful, inasmuch as the yields realized were negligible and the products obtained were not of a high degree of purity. Dehydrohalogenation processes carried out using such agents have generally resulted in the decomposition of the halogenated sterol compound with attendant darkening of the reaction mixture and the evolution of hydrogen halide. For these reasons the principal efforts of the prior art have been directed towards the development of various organic reagents for use in effecting the dehydrohalogenation of halogenated sterol compounds.

It is the object of this invention to provide a new and valuable improvement in the process for producing 7-dehydrosterols.

It is a further object of this invention to provide a new and highly improved process for the dehydrohalogenation of halogenated sterol compounds, using a readily available and inexpensive dehydrohalogenating agent.

Other objects of the invention will in part be obvious and will in part appear hereinafter.

It has been discovered in accordance with the present invention that the above and other objects can be achieved if the dehydrohalogenation of a halogenated sterol compound is effected by reacting the halogenated sterol compound with an alkali metal silicate. In the preferred practice of the invention 7-bromocholesteryl benzoate is dehydrohalogenated by refluxing it with sodium silicate in an aromatic hydrocarbon solvent for a period of time sufficient to effect complete dehydrohalogenation. The dehydrohalogenation process of the present invention is relatively simple as compared with the more complex processes of the prior art and in addition it utilizes an extremely cheap and stable base as the dehydrohalogenating agent. It thus has the added advantage of eliminating the necessity for recovering the dehydrohalogenating agent and further simplifies the overall process. The process of the present invention also makes possible the ready recovery of the sterol ester as such in a high degree of purity from the reaction mixture following the dehydrohalogenation step inasmuch as a simple filtration will remove the dehydrohalogenating agent from the reaction mixture. In this manner the necessity for washing the reaction mixture with an acid, to which the sterol compounds are generally quite sensitive, is avoided.

The present invention is not limited to the use of a particular alkali metal silicate or to the use of any particular form thereof, but embraces the use of all of the alkali metal silicates in any of the forms in which they exist, for the dehydrohalogenation of halogenated sterol compounds. Thus, both sodium and potassium silicates may be used in any of the forms in which they are available. The amount of alkali metal silicate which is employed in the reaction should be sufficient, of course, to react completely with the halogenated sterol compound which is to be dehydrohalogenated, i. e. at least equivalent quantities should be employed. As a matter of convenience, it is usually preferred to use an excess of alkali metal silicate over the amount theoretically required to bring about the dehydrohalogenation reaction. Thus, from about three moles to about six moles of alkali metal silicate per mole of halogenated sterol compound are conveniently employed. Larger amounts of alkali metal silicate per mole of halogenated sterol compound may be employed, if desired, but the use of such larger amounts is not necessary.

In carrying out the process of the invention, it is necessary to heat the mixture of alkali metal silicate and halogenated sterol compound with a suitable solvent. The solvents which are suitable for use in the practice of the invention are those which are inert to the reactants and which have a relatively high boiling point. While the most suitable solvents are those of the aromatic hydrocarbon type, such as xylene, toluene and the other solvents listed in U. S. Patent No. 2,546,788, any solvent having the required properties can be employed.

In carrying out the process it is necessary to heat the reaction mixture in order to bring about the desired dehydrohalogenation. In general, it is preferred to heat the reaction mixture at about the reflux temperature, thereof although temperatures of from about 80° C. to about 150° C. can be employed. It is evident that the time of treatment may likewise be varied over a considerable range, depending on the temperature at which the reaction is carried out. It is preferred to heat for a period of about 1½ hours when reflux temperature is maintained. The use of other temperatures will, of course, require corresponding adjustments in the period of heating.

At the completion of the dehydrohalogenation reaction the 7-dehydrosterol derivative can be readily recovered as such by means of a simple filtration to remove the dehydrohalogenating agent. Should the 7-dehydrosterol compound itself be desired it can be recovered from the dehydrohalogenation reaction mixture in any convenient manner. The exact method employed for isolating the 7-dehydrosterol compound will depend to some extent upon the specific derivative of the sterol employed as the starting material in the process. It is quite well known that a sterol compound, prior to being subjected to halogenation in accordance with the Ziegler process, must be treated in some manner or other so as to convert the hydroxyl group on the 3 position to a group which will not be detrimentally affected by the halogenating agent but which can conveniently be reconverted to a hydroxyl group. Thus the hydroxyl group may be converted to an ester group or to an ether group or it may be replaced with any other suitable inactive group which may later be split off with re-formation of the hydroxyl group at the 3 position. The most common practice in the prior art and what appears to be the most suitable and most feasible practice is to convert the hydroxyl group to an ester group by esterification with an efficient esterifying agent such as acetic anhydride, benzoyl chloride, or the like. If the sterol compound has been converted to an ester thereof, the sterol is re-formed by a simple hydrolysis of the ester group by saponification with alcoholic alkali. The usual practice in the prior art has been to remove the dehydrohalogenating agent from the reaction mixture prior to carrying out the saponification of the ester of the sterol compound. This is accomplished according to these prior art patents either by a process involving admixing the reaction mixture with an excess of an aqueous acid solution and extracting this mixture with a solvent such as ether or a hydrocarbon solvent to remove the 7-dehydrosterol ester from the aqueous mixture, or it is accomplished by a process involving the admixing of the dehydrohalogenation reaction mixture with an excess of a water-immiscible solvent such as petroleum ether and then extracting that mixture with an aqueous acid solution to remove the dehydrohalogenating agent from the solvent solution. In either case the solvent solution containing the 7-dehydrosterol ester is then washed with a dilute alkali solution to remove any acid dissolved in the solvent and thereafter the solvent solution is washed with water to remove any alkali dissolved in the solvent. Thereafter, the solvent is generally evaporated to recover the 7-dehydrosterol ester since the solvent which has been used in separating the ester from the dehydrohalogenation reaction mixture is generally a solvent which is not well suited as a vehicle in which to carry out the saponification of the ester to form the free sterol. After the ester has been isolated it is then hydrolyzed with an alcoholic alkali solution. The necessity for engaging in such a cumbersome and time consuming procedure is avoided by the practice of the present invention since one of the advantages of the process disclosed herein resides in the fact that the sterol ester can be readily recovered from the reaction mixture by reason of the fact that a simple filtration will suffice to remove the dehydrohalogenating agent from the reaction mixture. Thereafter the sterol ester can be recover from solution by evaporation of the solvent in which the dehydrohalogenation was affected or it can be precipitated from the solution by the addition of acetone. The ester is then hydrolyzed in the same fashion as in the prior art procedures. In an alternative procedure, the saponification of the esters can be carried out in accordance with the highly improved process which is disclosed and claimed in U. S. Patent 2,542,291. This process eliminates entirely the separation of the 7-dehydrosterol ester from the dehydrohalogenating agent prior to effecting the saponification of the ester. Instead the saponification is carried out directly in the reaction mixture obtained from the dehydrohalogenation reaction by dissolving the dehydrohalogenation reaction mixture in an excess of an alcoholic alkali solution wherein the alcohol is one containing not more than 4 carbon atoms, saponifying the 7-dehydrosterol ester in the resulting mixture, and cooling the solution to a temperature below room temperature whereupon the free 7-dehydrosterol crystallizes from the solution in a relatively high state of purity. Any other suitable means of carrying out the saponification of 7-dehydrosterol esters can, of course, be employed.

The yields of the desired 7-dehydrosterol compounds which are obtained when the dehydrohalogenation is effected using sodium silicate as the dehydrohalogenating agent are substantially equal to those obtained when the dehydrohalogenation is carried out using the most effective of the previously known dehydrohalogenating agents. More importantly, the products which are obtained are generally of a relatively high degree of purity, significantly higher than that of the products which are obtained when the dehydrohalogenation is carried out in accordance with the most satisfactory of the methods of the prior art. In this respect, it should be noted that the yields described in the prior art are misleading to a certain degree. For example, the highest purities reported for 7-dehydrocholesterol as produced in accordance with the prior art methods are from 57% to 67%. Experience has demonstrated that considerable losses are entailed in carrying out the purification of 7-dehydrocholesterol having such a relatively low degree of initial purity. Hence, the ultimate yields of the purified product may be materially less than the reported yields of the 57–67% pure products should lead one to expect.

As mentioned above, it is common practice to block the hydroxyl group on the 3 position of the sterol compound during the halogenation reaction by converting the hydroxyl group to a group which will not react with the dehydrohalogenating agent but which may later be reconverted to the hydroxyl group. For convenience, the term "inactive group" will be used herein in referring to such a group. For the purposes of the present invention, it is, of course, entirely immaterial just what inactive group is used to protect the 3 position of the sterol compound since the reaction between the halogenated sterol compound and the alkali metal silicate involves, of course, the removal of the halogen atom from the 7 position of the sterol compound and the removal of the hydrogen atom from the 8 position of the sterol compound.

The specific examples given hereinafter show the use of the halogenated benzoate esters of cholesterol in the process of the invention. These examples are only illustrative and the reaction which takes place between these halogenated esters and the alkali metal silicates takes place with equal efficiency and ease between the alkali metal silicate employed and any other sterol compound having a double bond between the 5 and 6 carbon atoms and a halogen atom on the 7 carbon atom. Thus the process of our invention is quite suitable for and is very effective in dehydrohalogenating any sterol compounds of this nature regardless of whether they are the esters, the ethers or any other suitable derivatives of the particular sterol compound being dehydrohalogenated. Furthermore, as far as the esters are concerned, any of the various sterol esters which may be formed can be dehydrohalogenated by the process of our invention. Among the sterol esters which have been utilized in the prior art patents and which are quite suitable for use in the process of our invention there may be mentioned the formate, the oxalate, the propionate, the butyrate, and the stearate esters of the halogenated sterol compounds, as well as the acetate and benzoate esters thereof.

For a fuller understanding of the nature and objects of the invention, reference may be had to the following examples which are given merely as further illustrations of the invention and are not to be construed in a limiting sense.

Example I

A mixture of 25.0 grams of crude 7-bromocholesterol benzoate and 25.0 grams of finely divided, anhydrous sodium silicate in 125 mls. of xylene were refluxed for 1½ hours with vigorous stirring. The reaction mixture was cooled to about 40° C., filtered, the sodium silicate washed with 15 ml. of fresh xylene, and the filtrate and washings combined and then diluted with 800 ml. of acetone. The resulting solution was chilled to 15° C. and held at this temperature overnight. The 7-dehydrocholesterol benzoate was separated by filtration and air-dried overnight. A yield of 10.9 grams of 82.3% pure ester was obtained. The yield of 7-dehydrocholesterol benzoate based on the amount of crude 7-bromocholesteryl benzoate employed was 41.8%.

The calculation of the above yield assumes a 100% purity for the crude 7-bromocholesterol benzoate employed as the starting material. Inasmuch as experience has shown that the crude 7-bromocholesterol benzoate actually has a purity of about 75 to 80%, it is evident that the actual percentage yield of 7-dehydrocholesterol benzoate obtained is considerably higher than the 41.8% yield reported above.

Example II

The process of the above example was repeated using 15 grams of sodium silicate instead of the 25 grams used in Example I. 6.7 grams of 7-dehydrocholesterol benzoate were obtained.

Example III

The process of Example I was repeated using the same amounts of reactants and the same reaction conditions, with the single exception that the sodium silicate used in this example was not in a finely divided state. The process of this example returned a yield of 7.5 grams of 7-dehydrocholesterol benzoate.

Example IV

A composite 10 gram sample of 7-dehydrocholesterol benzoate obtained by the dehydrohalogenation of 7-bromocholesterol benzoate using sodium silicate as the dehydrohalogenating agent was refluxed with 43.3 grams of a 10% solution of potassium hydroxide in ethanol for 1 hour with attendant stirring. The reaction mixture was then cooled to 30° C., and 100 ml. of methylene chloride and 50 ml. of water were added. The layers which formed were separated, 100 mls. of water were added to the aqueous layer, and the mixture was re-extracted with 50 ml. of methylene chloride. The combined methylene chloride extracts were treated with activated carbon, filtered, and then concentrated to a volume of 50 ml. 50 ml. of methanol were added and the mixture was chilled overnight. The crude 7-dehydrocholesterol which separated was air-dried, returning a yield of 4.4 grams on the first crop. The product analyzed 88.4% sterol and showed a purity of 100% as the digitonide upon spectroscopic analysis.

Inasmuch as the saponification was carried out solely for the purpose of unequivocal identification of the 7-dehydrocholesterol benzoate no attempt was made to realize an increased yield of the 7-dehydrocholesterol.

From the above illustrative examples and the general description of the invention given herein, it is readily apparent that the present invention provides a greatly simplified process for the dehydrohalogenation of halogenated sterol compounds and one which can be successfully carried out using an inexpensive and readily available dehydrohalogenating agent. Although the detailed examples given hereinabove have dealt with the treatment of esters of cholesterol, the process of our invention can be applied to the treatment of any esters of any similar sterol or to any other sterol derivative in which the 3 position is protected by some inactive group on the 3 position other than an ester group such as, for example, an ether group. The particular inactive group which is at the 3 position to protect that position from attack throughout the process of converting the sterol to a 7-dehydrosterol is entirely unimportant as far as the process of our invention is concerned, inasmuch as the particular group which is on the 3 position in no way enters into the reaction which occurs between the halogenated sterol compound and the alkali metal silicate. Consequently the process of our invention is applicable to the dehydrohalogenation of any sterol derivative having a double bond between the 5 and 6 carbon atoms and having a halogen atom on the 7 carbon atom.

Having described our invention, what we claim as new and desire to secure by Letters Patent is:

1. In a process for producing a 7-dehydrosterol, the step which comprises reacting an alkali metal silicate with a sterol derivative from the group consisting of sterol esters and sterol ethers which have a double bond between the 5 carbon atom and the 6 carbon atom and which have a halogen atom attached to the 7 carbon atom, the reaction being carried out by heating the silicate compound and the halogenated sterol compound in an inert solvent at a temperature of not less than about 80° C.

2. In a process for producing a 7-dehydrosterol, the step which comprises reacting an alkali metal silicate with a sterol derivative from the group consisting of sterol esters and sterol ethers which have a double bond between the 5 carbon atom and the 6 carbon atom and which have a halogen atom attached to the 7 carbon atom, the reaction being carried out by heating the silicate compound and the halogenated sterol compound in an inert aromatic hydrocarbon solvent at a temperature of not less than about 80° C.

3. In a process for producing a 7-dehydrosterol, the step which comprises reacting in alkali metal silicate with a sterol ether which has a double bond between the 5 carbon atom and the 6 carbon atom and which has a halogen atom attached to the 7 carbon atom, the reaction being carried out by heating the silicate compound and the sterol ether in an inert aromatic hydrocarbon solvent at a temperature of not less than about 80° C.

4. In a process for producing a 7-dehydrosterol, the step which comprises reacting an alkali metal silicate with a sterol ester which has a double bond between the 5 carbon atom and the 6 carbon atom and which has a halogen atom attached to the 7 carbon atom, the reaction being carried out by heating the silicate compound and the sterol ester in an inert aromatic hydrocarbon solvent at a temperature of not less than about 80° C.

5. In a process for producing 7-dehydrocholesterol, the step which comprises reacting an alkali metal silicate with an ester of cholesterol which has a halogen atom attached to the 7 carbon atom, the reaction being carried out by heating the silicate compound and the ester of cholesterol in an inert aromatic hydrocarbon solvent at a temperature of not less than about 80° C.

6. In a process for producing 7-dehydrocholesterol, the step which comprises reacting an alkali metal silicate with a benzoate ester of cholesterol which has a halogen atom attached to the 7 carbon atom, the reaction being carried out by heating the silicate compound and the benzoate ester of cholesterol in an inert aromatic hydrocarbon solvent at a temperature of not less than about 80° C.

7. In a process for producing 7-dehydrocholesterol, the step which comprises reacting an alkali metal silicate with 7-bromocholesteryl benzoate, the reaction being carried out by heating the alkali metal silicate and 7-bromocholesteryl benzoate in an inert aromatic hydrocarbon solvent at a temperature of not less than about 80° C.

8. In a process for producing 7-dehydrocholesterol, the step which comprises reacting sodium silicate with 7- bromocholesteryl benzoate, the reaction being carried out by heating sodium silicate and 7-bromocholesteryl benzoate in an inert aromatic hydrocarbon solvent at a temperature of not less than about 80° C.

9. In a process for producing 7-dehydrocholesterol, the step which comprises reacting sodium silicate with 7-bromocholesteryl benzoate, the reaction being carried out by heating sodium silicate and 7-bromocholesteryl benzoate in xylene at a temperature of not less than about 80° C.

10. A process for the dehydrohalogenation of a halogenated sterol compound which comprises reacting an alkali metal silicate with a sterol derivative from the group consisting of sterol esters and sterol ethers which have a double bond between the 5 carbon atom and the 6 carbon atom and which have a halogen atom attached to the 7 carbon atom, the reaction being carried out by heating the alkali metal silicate and the halogenated sterol compound in an inert aromatic hydrocarbon solvent at a temperature of not less than about 80° C.

11. A process according to claim 10 in which the sterol derivative is a sterol ether.

12. A process according to claim 10 in which the sterol derivative is a sterol ester.

13. A process according to claim 12 in which the sterol ester is an ester of cholesterol.

14. A process according to claim 13 in which the ester of cholesterol is a benzoate ester of cholesterol.

15. A process according to claim 14 in which the benzoate ester of cholesterol is 7-bromocholesteryl benzoate.

16. A process according to claim 15 in which the alkali metal silicate is sodium silicate.

17. A process according to claim 16 in which inert aromatic hydrocarbon solvent is xylene.

18. A process according to claim 17 in which the reaction is carried out by heating the sodium silicate and the 7-bromocholesteryl benzoate in xylene at the reflux temperature.

References Cited in the file of this patent

UNITED STATES PATENTS

| | | |
|---|---|---|
| 2,538,072 | Zech | Jan. 16, 1951 |
| 2,546,787 | Ruigh | Mar. 27, 1951 |
| 2,546,788 | Schaaf | Mar. 27, 1951 |
| 2,581,464 | Zech | Jan. 8, 1952 |